Figure 1:
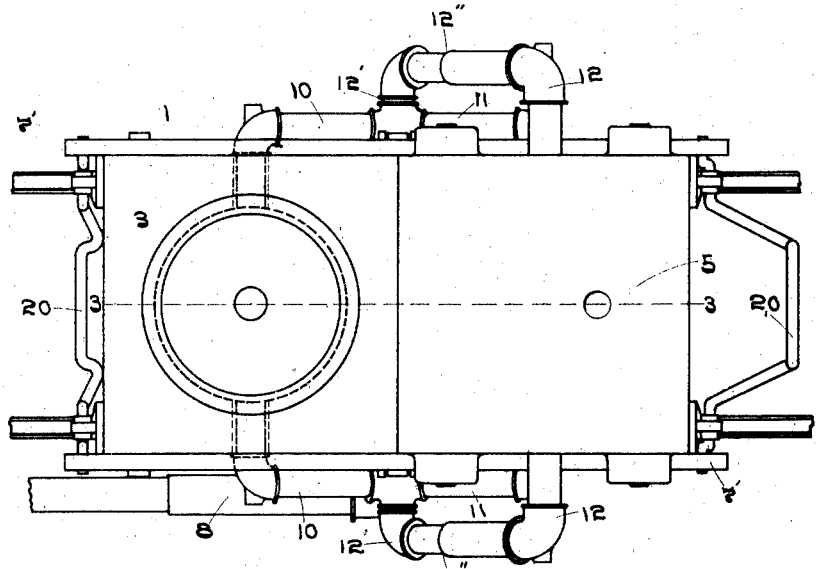

No. 864,665. PATENTED AUG. 27, 1907.
I. A. MILLIRON & C. W. IRWIN.
GLASS WORKING FURNACE.
APPLICATION FILED JAN. 5, 1906. RENEWED NOV. 20, 1906.

2 SHEETS—SHEET 1.

Witnesses

Inventors
IRA A. MILLIRON
CLIFTON W. IRWIN

By Edward R. Inman
Attorney

No. 864,665. PATENTED AUG. 27, 1907.
I. A. MILLIRON & C. W. IRWIN.
GLASS WORKING FURNACE.
APPLICATION FILED JAN. 5, 1906. RENEWED NOV. 20, 1906.

2 SHEETS—SHEET 2.

Witnesses
C. F. Wenzel
Laura S. Inman

Inventors
IRA A. MILLIRON
CLIFTON W. IRWIN
By Edward R. Inman
Attorney

UNITED STATES PATENT OFFICE.

IRA A. MILLIRON AND CLIFTON W. IRWIN, OF FRANKLIN, PENNSYLVANIA; SAID IRWIN ASSIGNOR TO SAID MILLIRON.

GLASS-WORKING FURNACE.

No. 864,665.   Specification of Letters Patent.   Patented Aug. 27, 1907.

Application filed January 5, 1906, Serial No. 294,780. Renewed November 20, 1906. Serial No. 344,316.

*To all whom it may concern:*

Be it known that we, IRA A. MILLIRON and CLIFTON W. IRWIN, citizens of the United States, residing at Franklin, in the county of Venango and State of Pennsylvania, have invented certain new and useful Improvements in Glass-Working Furnaces, of which the following is a specification, reference being had therein to the accompanying drawing.

Our invention relates to glass-working furnaces, and more particularly such as are used in connection with the drawing of glass articles from a body of molten glass contained in a drawing-pot or other suitable receptacle.

In the accompanying drawings we show a glass-working furnace, embodying our improvements, in the form which we prefer to employ.

Figure 2:
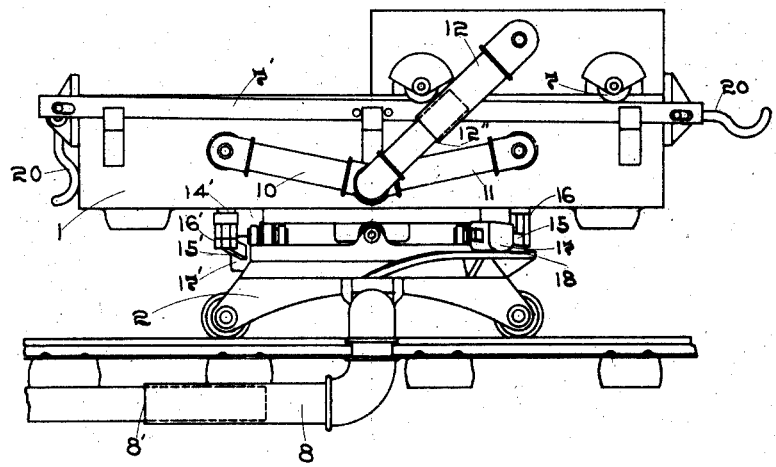
Figure 3:
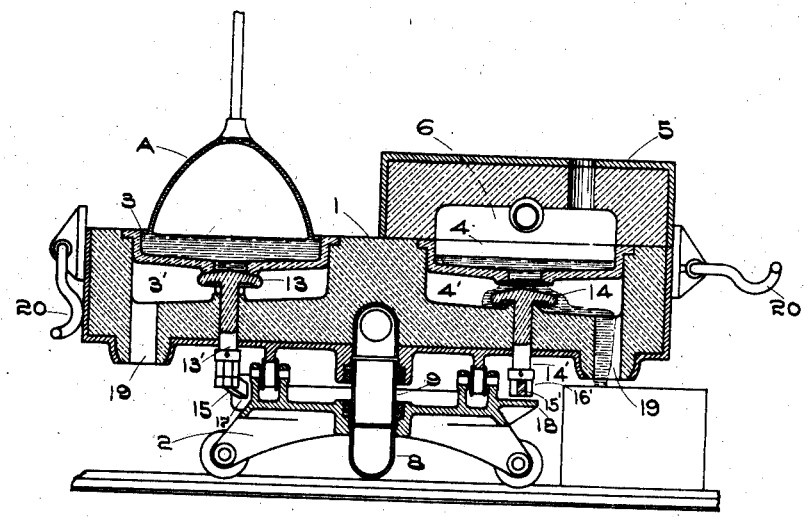
Figure 4:
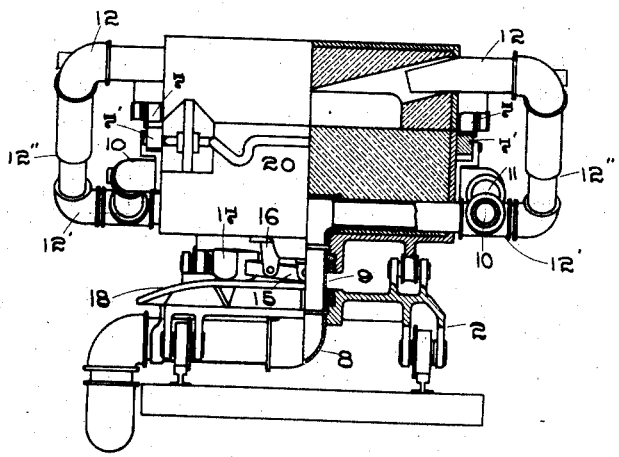

Figure 1 is a plan view of the furnace. Fig. 2 is a side elevation of same. Fig. 3 is a central, vertical section on line 3—3 of Fig. 1. Fig. 4 is a view of the furnace partly in elevation and partly in section.

The same reference letters indicate identical parts in the several views.

The object of our invention is to provide a portable glass-working furnace which may be placed in convenient proximity to a melting tank or other source of glass supply for the purpose of receiving glass therefrom, and conveying same to a drawing apparatus without the cessation or interruption of the application of heat thereto.

A further object of our invention is to provide a more efficient, practical and convenient means than has heretofore been devised for emptying the pot or glass receptacle of any glass which may remain therein after the drawing operation, it being preferred that the pot shall contain only a measured quantity of glass very little in excess of that required for the drawing of a single article, and that after each drawing operation the pot shall be emptied of such excess, if any, before refilling preparatory to the drawing of another article.

The construction of our preferred apparatus is substantially as follows:

The furnace 1 is mounted upon a truck 2; said furnace is preferably of oblong, rectangular construction and in each end thereof is located a pot 3, 4, beneath each of which is a heat chamber 3′, 4′; mounted above said furnace is a cover for the pots, which is preferably arched, as shown, to form a hood 5 containing a heat chamber 6: said hood is movable upon the top of the furnace from one pot to another, and for that purpose is preferably mounted upon wheels 7, which are constructed to travel upon the vertically-movable track 7′.

Furnace 1 is so mounted upon truck 2, that it is capable of being horizontally revolved for the purpose of bringing either pot into alinement with a drawing apparatus, or into a glass-receiving position near or beneath the delivery chamber of a melting tank, (not shown) or into convenient proximity to any other means by which glass may be delivered into said pots.

Fuel may be delivered to the several heat chambers by the following means: A main fuel-supply pipe 8 is affixed to the truck 2 directly at the center thereof and is connected to the lower portion of furnace 1 at its pivotal point, by means of the swivel joint 9; above said joint the pipe branches and is carried out through each side of the furnace 1 and a branch 10, 11, thereof is carried into each side of the heat chambers 3′, 4′ of the furnace, and two other branches 12 thereof are carried to the heat chamber of the hood,—a branch entering each side of said chamber. Inasmuch as said hood is movable, pipe 12 is adapted to admit of said movement by means of the swivel joint at 12′, and a telescope joint at 12″, which is ample provision to admit of the hood being moved to-and-fro over the top of the furnace.

A telescope joint is provided in the main fuel-supply pipe 8 at 8′ to admit of the truck 2 traveling longitudinally of said pipe.

Through the bottom of each pot 3, 4, is formed a hole adapted to be closed by the plug or closure, 13, 14, which closures are of similar construction, each preferably consisting of a mushroom-shaped head, provided with a stem 13′, 14′, which stems project through the bottom of the furnace, each with its lower extremity resting upon a lever 15, 15′: said levers are each fulcrumed in a bracket 16, 16′ which brackets are affixed to the bottom of the furnace 1, and upon the other end of said lever is placed a counter-weight 17, 17′: upon one side of the frame of truck 2 is constructed a track 18, upon which said counterweight rests as it travels over said track, this raises the counterweight and causes the opposite end of the lever upon which the stem rests to fall, thus permitting the head of the closure to drop away from its seat at the lower face of the opening through the bottom of the pot. Upon that side of the truck where there is no track, the counterweight falls by gravity which raises the opposite end of its respective lever and the thereon resting closure, and causes the head of said closure to rest in its respective seat in the bottom of the pot and thus close the opening.

Applicants particularly point out the fact that they do not wish to confine themselves to any particular form or size of opening in the bottom of the pots, or to any particular form of closure therefor or means for operating the closure. Said opening could be comparatively small or it could be nearly or quite as large as the diameter of the pot, and the closure therefor could be relatively proportioned, and in either the spirit or scope of our invention would not be departed from, or the practical operation of the construction be interfered with.

When the furnace is in operation, a quantity of glass is supplied to one of the pots (pot 3, as shown in the drawing) from any suitable source; said pot is then brought into alinement with a drawing apparatus and an article is drawn therefrom, as shown at A: when the supply of glass in said pot is used up, the furnace is turned horizontally a half revolution, which causes the counterweight 15 to rest upon the track 18, and this causes the closure 13 to drop away from the opening in the bottom of said pot, and any glass remaining in the pot flows out through said opening into the heat-chamber 3', from which chamber said glass may blow by way of the opening 19. For the purpose of assisting to keep said remaining glass hot enough to flow freely, hood 5 is moved over the pot, and the heat generated in the heat chamber 6 of the hood is applied directly to said glass, which causes it to flow freely from the opening in the bottom of the pot. Pot 4 is then filled with glass and an article drawn therefrom in the manner just described for pot 3, and when the glass therein is used up, as nearly as practicable, the furnace is again given a half-revolution, the closure of said pot 4 is dropped, the hood is positioned above said pot, and the unused glass emptied from the same. Thus it will be understood that while one pot is being drawn from, the other pot is being emptied of any remaining glass, and being prepared to be refilled and placed in readiness for the next drawing operation.

The track 7', upon which hood 5 travels, is adapted to be raised and lowered by means of the eccentric levers 20, located at each end of the furnace. This construction is for the purpose of raising the lower face of said hood free from said furnace, to effect its portability, or for causing the same to rest directly upon the top of the furnace, thus preventing the escape of heat from beneath the hood.

Having thus described our invention, what we claim as new and desire to secure by Letters Patent, is:—

1. A glass-working furnace constructed to revolve horizontally, pots located in the top of said furnace, there being a heat-chamber beneath said pots, means of introducing fuel to said chamber, a hood movably mounted on top of said furnace and constructed so as to be located over either of said pots, a heat-chamber in said hood, and means of generating heat in said chamber.

2. A horizontally revoluble furnace, glass receptacles in the top of said furnace, there being an opening in the bottom of each of said receptacles for the purpose specified, a closure for said openings, means for actuating said closure, in combination with a hood mounted upon said furnace, constructed to be positioned over either of said receptacles, a heat chamber in said hood and means of generating heat in said chamber.

3. In a glass working furnace, the combination of a furnace, glass receptacles located therein, and each having an opening in its bottom, a means of closing said opening, and a hood located above said furnace, said hood having a heat chamber therein and constructed so that said chamber may be positioned over either of said pots.

4. A glass working furnace, a portable and revoluble furnace, having drawing pots in the top thereof, a movable means located above said pots for applying heat thereto, there being an opening in the bottom of each of said pots for the purpose set forth, and means of closing said openings.

5. In a glass working furnace, the combination of a plurality of drawing pots, each provided with an opening in the bottom, and means for closing said opening, of a heat generating means movably mounted above said pots and constructed to apply heat into the interior of any of said pots, as desired.

6. In a glass working furnace, a plurality of drawing pots, each provided with an opening in its bottom, and having a suitable closure, in combination with one heat generating means movably mounted above said pots, and constructed to be brought into register with any of said pots, for the purpose set forth.

7. In apparatus for the manufacture of glassware, the combination with a support, and a drawing-pot adapted to contain a measured quantity of molten glass mounted thereon, of an opening in the bottom of said drawing-pot, and a removable closure for said opening, substantially as described.

8. In apparatus for the manufacture of glassware, the combination with a support, a drawing-pot adapted to contain a measured quantity of molten glass mounted thereon, and means above said receptacle for applying heat thereto, of an opening in the bottom of said drawing-pot, and a removable closure for said opening, substantially as described.

9. In apparatus for the manufacture of glassware, a receptacle for molten glass, movable means for applying heat thereto, an opening in the bottom of said receptacle, and a removable closure for said opening, substantially as described.

10. In apparatus for the manufacture of glassware, the combination with a receptacle for molten glass, an opening in the bottom of said receptacle, and a removable closure for said opening, of a removable cover for said receptacle, an opening in said cover, and means for introducing heat through said opening into said receptacle, substantially as described.

11. In apparatus for the manufacture of glassware, a movable carrier, a receptacle for molten glass mounted thereon, an opening in the bottom of said receptacle, a movable closure for said opening, and means operated by the movement of the carrier for operating said closure, substantially as described.

12. In apparatus for the manufacture of glassware, a furnace, a plurality of receptacles for molten glass mounted thereon, a removable cover for said receptacles, an opening in said cover, and means movable with the cover for supplying fuel through said opening, substantially as described.

13. In apparatus for the manufacture of glassware, a furnace, a plurality of receptacles for molten glass mounted thereon, a heating-chamber for said receptacles movably mounted on said furnace, an opening in said heating-chamber, and means movable with said heating-chamber for supplying fuel thereto through said opening, substantially as described.

14. In apparatus for the manufacture of glassware, a support, a plurality of receptacles for molten glass mounted thereon, a cover-support carried by said receptacle-support, a cover for said receptacles movably mounted on said cover-support, and means for raising and lowering said cover-support, substantially as described.

15. In apparatus for the manufacture of glassware, the combination with a support, a receptacle for molten glass mounted thereon, and a heating-chamber below said receptacle, of a second heating-chamber movably mounted on said support and adapted to be shifted thereon into and out of position above said receptacle, means for supplying fuel to said heating-chambers respectively, and means for discharging waste glass from said receptacle, substantially as described.

16. In apparatus for the manufacture of glassware, a movable carrier, a receptacle for molten glass mounted thereon, a heating-chamber within the carrier and below said receptacle, and means for supplying fuel to said chamber, substantially as described.

17. In apparatus for the manufacture of glassware, a movable carrier, a plurality of receptacles for molten glass mounted thereon, a plurality of heating-chambers therefor within the carrier, and means for supplying fuel to said chambers respectively, substantially as described.

In testimony whereof we affix our signatures in presence of two witnesses.

IRA A. MILLIRON.
CLIFTON W. IRWIN.

Witnesses:
ROBERT N. SPEER,
E. R. INMAN.